United States Patent
Grzibek

(10) Patent No.: US 7,463,306 B1
(45) Date of Patent: Dec. 9, 2008

(54) PROCESSING INTERLACED AND PSEUDO INTERLACED SIGNALS

(75) Inventor: Rolf Grzibek, Frankfurt (DE)

(73) Assignee: Thomson Licensing, Boulogne-Billancourt (FR)

(*) Notice: Subject to any disclaimer, the term of this patent is extended or adjusted under 35 U.S.C. 154(b) by 0 days.

(21) Appl. No.: 09/257,638

(22) Filed: Feb. 25, 1999

(30) Foreign Application Priority Data

Feb. 26, 1998 (DE) ............................... 198 08 005

(51) Int. Cl.
H04N 7/01 (2006.01)
(52) U.S. Cl. .................... 348/446; 348/448; 348/458; 348/459; 348/441
(58) Field of Classification Search ................ 348/446, 348/448, 441, 445, 456, 457, 458, 598, 459, 348/911, 469, 467; H04N 7/01
See application file for complete search history.

(56) References Cited

U.S. PATENT DOCUMENTS

| | | | | |
|---|---|---|---|---|
| 4,386,367 A | * | 5/1983 | Peterson et al. | 348/446 |
| 4,613,906 A | * | 9/1986 | Tanaka et al. | 348/239 |
| 4,809,069 A | * | 2/1989 | Meyer et al. | 348/446 |
| 4,853,765 A | * | 8/1989 | Katsumata et al. | 348/451 |
| 4,866,520 A | * | 9/1989 | Nomura et al. | 348/441 |
| 5,021,772 A | | 6/1991 | King et al. | 340/724 |
| 5,257,348 A | | 10/1993 | Roskowski et al. | 395/157 |
| 5,272,535 A | * | 12/1993 | Elabd | 348/314 |
| 5,313,281 A | * | 5/1994 | Richards | 348/443 |
| 5,337,089 A | * | 8/1994 | Fisch | 348/446 |
| 5,457,498 A | * | 10/1995 | Hori et al. | 348/446 |
| 5,497,199 A | * | 3/1996 | Asada et al. | 348/446 |
| 5,610,661 A | * | 3/1997 | Bhatt | 348/446 |
| 5,633,687 A | * | 5/1997 | Bhayani et al. | 348/441 |
| 5,737,036 A | * | 4/1998 | Kanai et al. | 348/742 |

(Continued)

FOREIGN PATENT DOCUMENTS

DE 4201335 A1 7/1993

(Continued)

OTHER PUBLICATIONS

EPO Search Report dated Nov. 27, 2000.

*Primary Examiner*—David Ometz
*Assistant Examiner*—Jean W. Désir
(74) *Attorney, Agent, or Firm*—Joseph J. Laks; Frank Y. Liao; Francis A. Davenport

(57) ABSTRACT

In an arrangement for processing video signals provided as interlaced video signals generated in the interlaced scanning mode, in which two fields constitute one frame, and/or as pseudo-interlaced video signals derived from non-interlaced video signals obtained by means of progressive scanning, flexible use of the arrangement with a minimal number of components for this arrangement is achieved in that at least one video signal-processing unit (1) is provided which receives at least an interlaced video signal or at least a pseudo-interlaced video signal and processes these video signals in dependence upon control data generated by means of a control unit (2), and in that a clock generator (4) is provided which controls the control unit (2) and/or the video signal-processing unit (1) in such a way that, when processing an interlaced video signal or a pseudo-interlaced video signal, possibly new control data are generated and/or taken into account as from the start of its next field or its next frame, respectively.

9 Claims, 1 Drawing Sheet

U.S. PATENT DOCUMENTS 5,850,264 A * 12/1998 Agarwal ..................... 348/469
6,198,873 B1    3/2001 Takano

FOREIGN PATENT DOCUMENTS

| EP | 720387 A2 * | 7/1996 |
| JP | 9-83867 | 3/1997 |
| JP | 9-102909 | 4/1997 |

* cited by examiner

PROCESSING INTERLACED AND PSEUDO INTERLACED SIGNALS

BACKGROUND OF THE INVENTION

The invention relates to an arrangement for processing video signals provided as interlaced video signals generated in the interlaced scanning mode, in which two fields constitute one frame, and/or as pseudo-interlaced video signals derived from non-interlaced video signals obtained by means of progressive scanning.

State-of-the-art arrangements for processing video signals, for example, for mixing video signals are either implemented for video signals generated in accordance with the interlaced scanning mode or for video signals obtained by means of progressive scanning. Within an arrangement, a plurality of circuits may be provided, each one of which is, however, implemented either for video signals generated in the interlaced scanning mode or for video signals obtained by means of progressive scanning. If such arrangements are to be suitable for both types of video signals, a considerable number of components will be required.

Video signals generated in the interlaced scanning mode are internationally denoted as "interlaced" signals. In such signals, two fields jointly constitute one frame. The fields are generated in such a way that they are temporally transmitted one after the other and, upon display, are interlaced line by line in the interlaced scanning mode. The picture contents of the two fields may represent different motion phases of an object to be displayed. Video signals obtained by means of progressive scanning are internationally denoted as "non-interlaced" signals. In these signals, all picture lines of a frame are generated in a continuous consecutive sequence. Interlaced fields are then obtained.

It is known to convert non-interlaced video signals into such video signals in which a frame originally scanned in accordance with this scanning mode is split up into two fields. These are actually not fields, as are present in interlaced video signals, but a split-up non-interlaced frame. These frames are hereinafter denoted as pseudo-interlaced, because they can be transmitted similarly as fields of interlaced video signals in electronic arrangements. However, it should be noted that such fields of a pseudo-interlaced video signal must be processed in the same way.

SUMMARY OF THE INVENTION

It is an object of the invention to provide an arrangement for processing video signals of the type described in the opening paragraph, which, with a minimal number of components, allows both interlaced video signals and non-interlaced or pseudo-interlaced video signals to be processed.

According to the invention, this object is achieved in that at least one video signal-processing unit is provided which receives at least an interlaced video signal or at least a pseudo-interlaced video signal and processes these video signals in dependence upon control data generated by means of a control unit, and in that a clock generator is provided which controls the control unit and/or the video signal-processing unit in such a way that, when processing an interlaced video signal or a pseudo-interlaced video signal, possibly new control data are generated and/or taken into account as from the start of its next field or its next frame, respectively.

The video signal-processing unit processes the video signals. This unit may receive either a conventional interlaced video signal or a pseudo-interlaced video signal which is obtained by splitting up the frames of non-interlaced video signals into two pseudo-fields.

Two fields of a frame of an interlaced video signal can be processed in different ways. For example, the two fields may be subjected to a continuously changing mixing process because the two fields are displayed temporally one after the other. For a non-interlaced or pseudo-interlaced video signal, this is, however, not appropriate because the two generated pseudo-fields of a pseudo-interlaced video signal belong to a frame and display the same motion phase of the picture contents. If the two pseudo-fields were processed in different ways, this would be noticeable as interference in the picture upon the display of the non-interlaced video signal.

According to the invention, the control unit controlling the video signal processing by means of control data is controlled by means of a clock generator in such a way that fields of an interlaced video signal and pseudo-fields of a pseudo-interlaced video signal are processed in different ways.

When an interlaced video signal is processed, the clock generator controls the control unit or the video signal-processing unit in such a way that possibly changed control data are generated at the start of every new field or are taken into account by the video signal-processing unit. This means that at the start of every new field, the processing mode of the fields may be changed. As explained above, this is allowable for fields of an interlaced video signal.

However, if a pseudo-interlaced video signal is processed by the video signal-processing unit, then this is not allowable. In this case, the clock generator controls the control unit and the video signal-processing unit in such a way that only from the start of a new frame, i.e. the first pseudo-field of a frame, a new, changed mode of processing is performed by the video signal-processing unit. It is thereby ensured that two consecutive pseudo-fields of a pseudo-interlaced video signal belonging to the same frame of a non-interlaced video signal are processed in the same way so that no picture interferences become visible within this frame.

This arrangement is thus capable of processing both interlaced video signals and pseudo-interlaced video signals obtained from non-interlaced video signals. Dependent on the type of video signal, the control unit or the video signal-processing unit is controlled in such a way that optimal processing, adapted to the type of the video signal, takes place. In this way, only one video signal-processing unit is required for both types of video signals.

For an embodiment of the invention as claimed in claim 2, a buffer memory is provided which takes over the control data supplied by the control unit. The video signal-processing unit itself takes over the control data directly from the buffer memory and processes the video signals in dependence upon these control data. In this case, the video signal-processing unit may be implemented in such a way that it immediately takes a change of the control data into account, independently of the fact which field is processed next.

To ensure the different ways of processing the two types of video signals as explained above, the buffer memory is controlled by the clock generator in such a way that new control data can be taken over by the buffer memory at the start of every new field when an interlaced video signal is being processed. When a pseudo-interlaced video signal is being processed, the buffer memory is, however, controlled by means of the clock generator in such a way that new control data possibly generated by the control unit are taken over by the buffer memory only at the start of the next frame, i.e. the first pseudo-field of a pseudo-interlaced video signal.

Alternatively to the solution as claimed in claim 2, a further embodiment of the invention as claimed in claim 3 is characterized in that the control unit is already implemented in such a way that it supplies data at the appropriate times only. In this case, the buffer memory mentioned above is not required but may still be provided for practical reasons.

In accordance with a further embodiment as claimed in claim 4, the information about the fact which field of a video signal to be processed is present can be advantageously supplied to the clock generator by means of an externally generated genlock signal which is provided anyway in professional video-processing arrangements.

In accordance with a further embodiment as claimed in claim 5, the signal-processing unit may also be used advantageously for mixing a plurality of video signals.

It may be desirable to further process processed non-interlaced video signals and processed interlaced video signals separately, because these signals are to be further transmitted, for example, via different transmission paths. For this case, an embodiment as claimed in claim 6 provides at least two video signal-processing units, each of which process only allocated video signals which can be further processed separately. In this way, for example, pictures generated for a broadcast may be processed parallel in an interlaced or non-interlaced format. The two signal sequences may be processed in the same way so that the pictures are subjected to the same processors.

If a non-interlaced video signal to be processed is not already present in a pseudo-interlaced form, the conversion means as claimed in claim 7 are suitable for converting this video signal into the pseudo-interlaced format. Conversely, the reconversion means as claimed in claim 8 may be advantageously used for reconverting a pseudo-interlaced video signal processed in the arrangement into a non-interlaced video signal.

These and other aspects of the invention are apparent from and will be elucidated with reference to the embodiments described hereinafter.

DETAILED DESCRIPTION OF THE PREFERRED EMBODIMENTS

Figure 1:
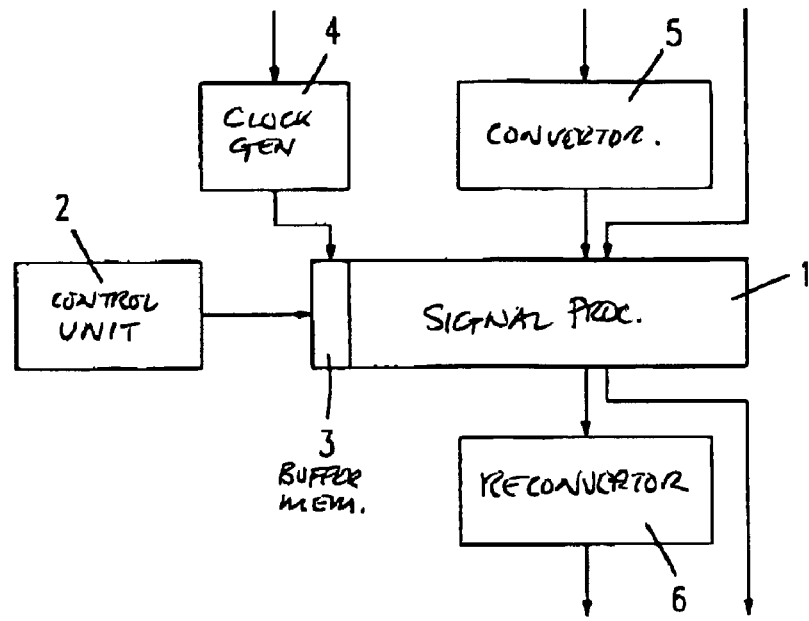
FIG. 1 is a block diagram of a first embodiment of the arrangement for processing video signals according to the invention, in which a buffer memory controlled by a clock generator is provided.

The block diagram, shown in FIG. 1, of the first embodiment of the video signal processing arrangement shows a video signal-processing unit 1. The video signal-processing unit 1 is used for processing video signals applied thereto, for example, for mixing or changing them in another way.

The video signal-processing unit 1 processes video signals in dependence upon control data which are generated by means of a control unit 2. The control unit 2 supplies these control data to a buffer memory 3. The video signal-processing unit 1 takes over the control data in a temporally undelayed manner from the buffer memory 3 and processes the video signals in a mode dependent on these control data. This is possibly effected without any noticeable delay, i.e. when control data change, the processing of the video signals changes accordingly.

The buffer memory 3 is controlled by means of a clock generator 4 which receives an externally generated genlock signal. The clock generator 4 controls the buffer memory in such a way that new control data are only taken over by this buffer memory when this is desirable in dependence upon the video signal. For example, when an interlaced video signal is being processed, possibly new control data are taken over by the buffer memory every time at the start of a new field. However, when a pseudo-interlaced video signal is processed, the buffer memory is controlled by the clock generator 4 in such a way that new control data are only taken over at the start of a new frame, i.e. at the start of the first pseudo-field of a pseudo-interlaced video signal.

It is thereby achieved that, in the case of non-interlaced video signals or pseudo-interlaced video signals, the processing is changed only at the start of a new frame so that all pseudo-fields of the pseudo-interlaced video signal are processed in the same way.

A non-interlaced video signal may be directly applied to the video signal-processing unit 1. Also a non-interlaced video signal converted already into the pseudo-interlaced form may be directly applied to this unit. A non-interlaced video signal, which is still present in its original form and is obtained by means of progressive scanning, is converted into a pseudo-interlaced video signal by optionally provided conversion means 5. A frame of such a non-interlaced video signal is then split up into two pseudo-fields which can be processed in a similar manner as the fields of a non-interlaced video signal. However, it should be noted for such pseudo-fields that they are to be processed in the same way.

Dependent on the type of signals processed by the video signal-processing unit 1, these signals are supplied in the same form again. If processed pseudo-interlaced video signals should be converted into non-interlaced video signals again, reconversion means 6 are optionally provided, which perform this conversion.

Figure 2:
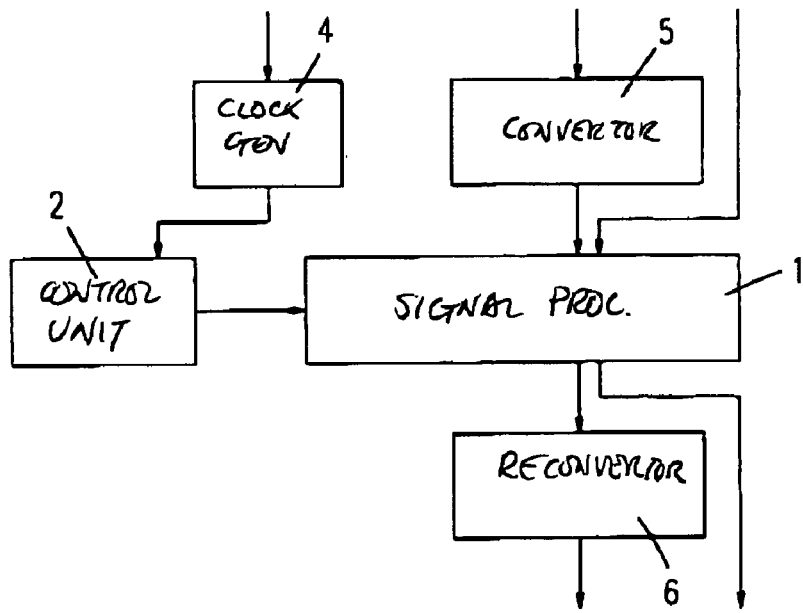
FIG. 2 is a block diagram of a second embodiment of the arrangement according to the invention, in which the clock generator controls a control unit of the video signal-processing unit.

A second embodiment of the arrangement according to the invention, also shown in the form of a block diagram in FIG. 2, corresponds to the first embodiment shown in FIG. 1, but the buffer memory 3 is not provided. Moreover, the clock generator 4 directly controls the control unit 2.

In this embodiment, the control unit 2 is controlled by the clock generator 4 in such a way that, when an interlaced video signal is being processed, it supplied new, modified control data only at the start of every new field and, when a pseudo-interlaced video signal is being processed, only at the start of a new frame, i.e. at the start of the first pseudo-field of a pseudo-interlaced video signal. In this way, it is also ensured that new, modified control data through the video signal-processing unit 1 are only taken into account at the desired instants.

The two embodiments of the arrangement according to the invention ensure that two pseudo-fields of a frame of a pseudo-interlaced video signal are processed in the same way. If this signal is reconverted into a conventional non-interlaced video signal, it is ensured that all picture lines of the frame are processed in the same way. This is important because these lines of a frame display identical motion phases. However, when a non-interlaced video signal is being processed, two fields of a frame may be processed in different ways, if desired, because they are displayed temporally one after the other and represent different motion phases. This differentiation in the processing of the video signals is obtained by means of the arrangement according to the invention with a small number of components. Moreover, such an arrangement can be very flexibly used for different types of video signals.

The invention claimed is:

1. An arrangement for processing video signals provided as interlaced video signals generated in the interlaced scanning mode, in which two fields constitute one frame, and/or as pseudo-interlaced video signals derived from non-interlaced video signals obtained by means of progressive scanning, characterized in that at least one video signal-processing unit (1) is provided which receives at least an interlaced video signal or at least a pseudo-interlaced video signal and processes these video signals in dependence upon control data generated by means of a control unit (2), and in that a clock generator (4) is provided which controls the control unit (2) and/or the video signal-processing unit (1) in such a way that, when processing an interlaced video signal or a pseudo-interlaced video signal, possibly new control data are generated and/or taken into account as from the start of its next field or its next frame, respectively.

2. An arrangement as claimed in claim 1, characterized in that a buffer memory (3) is provided for the control data, from which buffer memory the video signal-processing unit (1) directly takes over and employs the control data and which is controlled by the clock generator (4) in such a way that it takes over new control data when processing an interlaced video signal or a pseudo-interlaced video signal at the start of its next field or its next frame, respectively.

3. An arrangement as claimed in claim 1, characterized in that the clock generator (4) controls the control unit (2) in such a way that it supplies new control data to the video signal-processing unit when processing an interlaced video signal or a pseudo-interlaced video signal at the start of its next field or its next frame, respectively.

4. An arrangement as claimed in claim 1, characterized in that the clock generator (4) is controlled by means of a genlock signal which comprises information about the synchronizing signals of the video signal to be processed.

5. An arrangement as claimed in claim 1, characterized in that the video signal-processing unit (1) is provided to mix at least two video signals.

6. An arrangement as claimed in claim 1, characterized in that two video signal-processing units (1) are provided, a first of which is provided to process one or more interlaced video signals and a second is provided to process one or more pseudo-interlaced video signals.

7. An arrangement as claimed in claim 1, characterized in that conversion means (5) are provided to convert non-interlaced video signals into pseudo-interlaced video signals having a scanning line and sync pulse structure which is similar to that of interlaced signals and allows said signals to be processed in the video signal-processing unit.

8. An arrangement as claimed in claim 1, characterized in that reconversion means (6) are provided which convert pseudo-interlaced signals supplied by the video signal-processing unit into non-interlaced video signals and supply them as such.

9. A video processor for processing interlaced video signals generated in the interlaced scanning mode, in which two fields constitute one frame, and a pseudo interlaced video signals derived from non-interlaced video signals obtained by means of progressive scanning, said processor comprising:
- a video signal processing unit receiving one of an interlaced video signal and a pseudo-interlaced video signal for processing in accordance with control data;
- a control unit generating said control data for said processing unit; and,
- a clock generator coupled to said control unit for controlling said control data,
- wherein said control data initiates processing of said interlaced video signal by said video signal processing unit from the start of the next field, and initiates processing of said pseudo interlaced video signal from the start of the next frame.

* * * * *